S. R. BAILEY.
VEHICLE BODY.
APPLICATION FILED JUNE 22, 1908.

955,494.

Patented Apr. 19, 1910.

Witnesses:
H. B. Davis.
Cynthia Doyle.

Inventor:
Saml. R. Bailey
by Rogers & Harriman
Attys

UNITED STATES PATENT OFFICE.

SAMUEL R. BAILEY, OF AMESBURY, MASSACHUSETTS, ASSIGNOR TO S. R. BAILEY & CO., INC., OF AMESBURY, MASSACHUSETTS, A CORPORATION OF MASSACHUSETTS.

VEHICLE-BODY.

955,494.  Specification of Letters Patent.  Patented Apr. 19, 1910.

Application filed June 22, 1908. Serial No. 439,673.

*To all whom it may concern:*

Be it known that I, SAMUEL R. BAILEY, of Amesbury, county of Essex, State of Massachusetts, have invented an Improvement in Vehicle-Bodies, of which the following is a specification.

This invention relates to a vehicle body which is especially designed to be used in an automobile, and particularly for an electric automobile, which must carry storage batteries, the weight of which places a heavy load on the vehicle body, in addition to the regular load.

A vehicle body, when use for the above purpose must be made transversely flexible throughout its length, as it has been found by experience that if it is made rigid it will soon become broken. On the other hand, not only is the greatest flexibility which is consistent with safety and strength desirable, but lightness and durability in construction, are matters of great importance.

The object of the present invention is to provide a vehicle body especially adapted for the purpose above referred to, which shall be light and flexible and yet sufficiently strong to bear such transverse and vertical strain as may be placed thereon.

Figure 1:
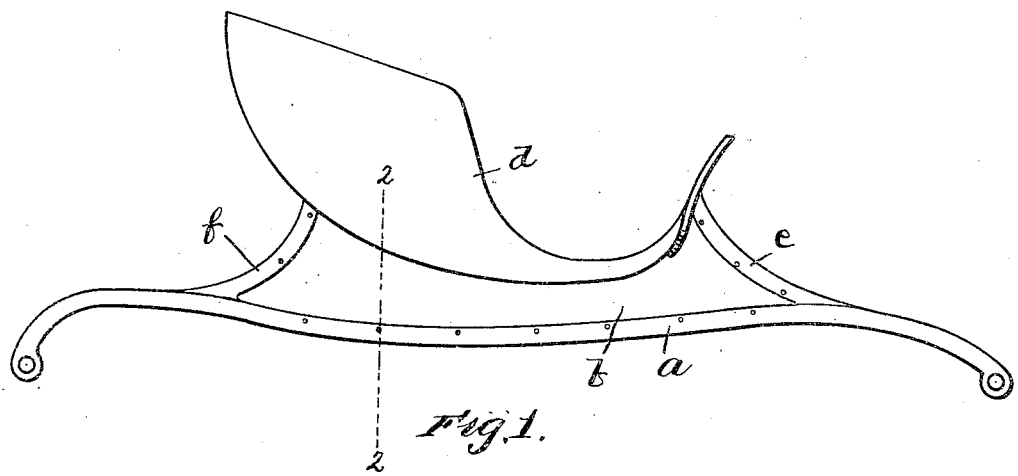
Figure 2:
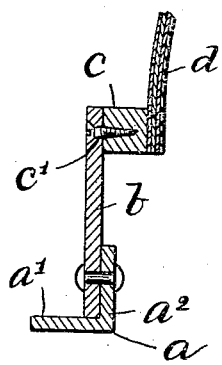
Figure 3:
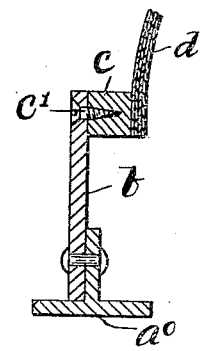

I accomplish these objects by the means shown in the accompanying drawing, in which, Figure 1 is a side elevation of a vehicle body made according to my invention. Fig. 2 is an enlarged cross sectional view taken on the line 2—2 of Fig. 1. Fig. 3 is a similar view illustrating a slight modification.

According to my invention I provide an angle-iron $a$ which preferably is in the form of an ordinary L-iron, although a T-iron $a^0$ may be also advantageously employed in this connection, as shown in Fig. 3, said L-iron having a horizontal portion $a'$ and a vertical portion $a^2$, and said iron extending the entire length of the body and being adapted to be connected at its ends to the vehicle springs in a well-known manner. A thin metal plate $b$, preferably of steel, is securely riveted to the inner side of the upright portion $a^2$ of the L-iron, and rests at its lower edge throughout the length thereof, on the horizontal portion $a'$ thereof. Said plate $b$ projects for a distance, varying according to the lines of the body, above the upper edge of the vertical portion $a^2$ of the bottom iron $a$ and a wooden sill $c$ is secured by screws $c'$, or other suitable means, to the outer side of said plate $b$ along the upper edge thereof, throughout the entire length of said upper edge at closely adjacent points, so that independent bending of either with relation to the other is not possible. A side $d$, preferably built up of laminated wood, as indicated, is securely glued to the outer side of the sill $c$, and extends upwardly to form the sides of the body. The upper edge of the plate $b$ is preferably flush with the upper edge of the sill and the lower edge of the sill is preferably flush with the lower edge of the side $d$. L-irons $e$, $f$ are secured to the front and rear end edges of the plate $b$, the lower ends of said irons $e$ and $f$ being welded to the bottom iron $a$.

With the above described arrangement the plate $b$, by reason of the fact that it is held in an exactly vertical position, is capable of supporting a great weight relatively to the amount of material actually employed. This would not be possible, however, if the plate were not rigidly held at its upper and lower edge respectively, by the sill $c$ and L-iron $a$, so that it is impossible for said plate to buckle, as it would be likely to do when subjected to transverse as well as vertical strain. The action of the sill $c$ in holding the upper edge portion of the plate $b$ from buckling is of special importance, for if the plate should be buckled, even to a slight extent, at its upper edge, if it were at the same time subjected to a heavy load, the plate would be likely to collapse. The whole side is, however, capable of being bent transversely to any required degree without affecting its capability of supporting a vertical load. The end irons $e$ and $f$ also aid very materially in holding the plate $b$ flat.

Having thus described my invention, what I claim as new and desire to secure by Letters Patent is:—

1. A vehicle body comprising a longitudinal bottom iron having a vertical side portion, a vertically disposed metal side plate having its lower edge portion rigidly secured to said side portion, a sill secured to the outer side of said plate at the upper edge portion thereof, and a side secured to the outer side of said sill, substantially as described.

2. A vehicle body comprising a longitudinal bottom iron having horizontally and vertically disposed portions, a vertically disposed metal side-plate rigidly secured at its lower edge portion, throughout its length, to the vertically disposed portion of said iron and extending thereabove, a sill rigidly secured to the outer side and upper edge portion of said plate and a side secured to the outer side of said sill, substantially as described.

3. A vehicle body comprising a longitudinal bottom iron having horizontally and vertically disposed portions, a vertically disposed metal side-plate having its lower edge resting on said horizontal portion and the lower portion of its side rigidly secured against the side of said vertical portion of said iron, and projecting thereabove, a sill rigidly secured to one side of the upper edge portion of said plate, and a side secured to the outer side of said sill, substantially as described.

4. A vehicle body comprising an angle-iron extending longitudinally of the side having one of its portions extending vertically, a vertically disposed sheet-metal side plate rigidly secured at its lower edge portion to said vertical portion of said iron and extending thereabove, a wooden sill secured at one side by screws to one side of said plate at the upper edge thereof throughout its length, and a wooden side securely glued to the opposite side of said sill, substantially as described.

In testimony whereof, I have signed my name to this specification, in the presence of two subscribing witnesses.

SAMUEL R. BAILEY.

Witnesses:
L. H. HARRIMAN,
A. W. REDDY.